United States Patent
Wells

(10) Patent No.: US 11,399,678 B2
(45) Date of Patent: Aug. 2, 2022

(54) DUST CUP SHUTTER FOR ROBOTIC CLEANER

(71) Applicant: SharkNinja Operating, LLC, Needham, MA (US)

(72) Inventor: Simon Wells, Needham, MA (US)

(73) Assignee: SharkNinja Operating LLC, Needham, MA (US)

( * ) Notice: Subject to any disclaimer, the term of this patent is extended or adjusted under 35 U.S.C. 154(b) by 323 days.

(21) Appl. No.: 16/815,450

(22) Filed: Mar. 11, 2020

(65) Prior Publication Data

US 2020/0288930 A1    Sep. 17, 2020

Related U.S. Application Data

(60) Provisional application No. 62/816,512, filed on Mar. 11, 2019.

(51) Int. Cl.
| | |
|---|---|
| *A47L 9/10* | (2006.01) |
| *A47L 9/04* | (2006.01) |
| *A47L 9/28* | (2006.01) |
| *A47L 11/40* | (2006.01) |
| *G05D 1/02* | (2020.01) |

(52) U.S. Cl.
CPC ............ *A47L 9/108* (2013.01); *A47L 9/0466* (2013.01); *A47L 9/2873* (2013.01); *A47L 11/4011* (2013.01); *A47L 11/4036* (2013.01); *G05D 1/0225* (2013.01); *A47L 2201/024* (2013.01); *G05D 2201/0215* (2013.01)

(58) Field of Classification Search
CPC .............. A47L 11/4011; A47L 11/4036; A47L 2201/00; A47L 2201/024; A47L 9/0466; A47L 9/0477; A47L 9/0488; A47L 9/0613; A47L 9/0633; A47L 9/108; A47L 9/2873; G05D 1/0225; G05D 2201/0215
See application file for complete search history.

(56) References Cited

U.S. PATENT DOCUMENTS 8,065,778 B2 * 11/2011 Kim ....................... A47L 9/1463
                                                            15/349
8,584,305 B2    11/2013 Won et al.
(Continued)

FOREIGN PATENT DOCUMENTS

KR    20100136882 A  * 12/2010
KR    20130102938 A  *  9/2013
(Continued)

OTHER PUBLICATIONS

PCT Search Report and Written Opinion dated Jun. 15, 2020, received in PCT Application No. PCT/US20/21997, 11 pgs.
(Continued)

*Primary Examiner* — Marc Carlson
(74) *Attorney, Agent, or Firm* — Grossman Tucker Perreault & Pfleger, PLLC

(57) ABSTRACT

A robotic cleaner may include a body, an agitator chamber within the body, an agitator disposed within the agitator chamber, a dust cup removably coupled to the body, the dust cup including a debris inlet, the debris inlet fluidly coupling the dust cup to the agitator chamber, and a shutter configured to transition between a cleaning position and an evacuation position in response to rotational movement of the agitator.

20 Claims, 13 Drawing Sheets

(56) References Cited

U.S. PATENT DOCUMENTS

| | | | |
|---|---|---|---|
| 9,060,666 B2* | 6/2015 | Jang | A47L 11/33 |
| 2008/0201895 A1* | 8/2008 | Kim | A47L 9/106 |
| | | | 901/1 |
| 2008/0235897 A1* | 10/2008 | Kim | A47L 11/4013 |
| | | | 901/1 |
| 2015/0250371 A1* | 9/2015 | Jang | A47L 11/33 |
| | | | 15/49.1 |
| 2019/0069744 A1 | 3/2019 | Liggett et al. | |
| 2020/0205629 A1* | 7/2020 | Hong | A47L 9/009 |
| 2021/0100416 A1* | 4/2021 | Choi | A47L 9/2831 |

FOREIGN PATENT DOCUMENTS

| | | |
|---|---|---|
| KR | 20130102938 A | 9/2013 |
| WO | 2005055796 A2 | 6/2005 |

OTHER PUBLICATIONS

Chinese Office Action with English translation dated Mar. 9, 2022, received in Chinese Patent Application No. 202080020823.4, 10 pages.

* cited by examiner

DUST CUP SHUTTER FOR ROBOTIC CLEANER

CROSS-REFERENCE TO RELATED APPLICATIONS

The present application claims the benefit of U.S. Provisional Application Ser. No. 62/816,512 filed on Mar. 11, 2019, entitled Dust Cup Shutter for Robotic Cleaner, which is fully incorporated herein by reference.

TECHNICAL FIELD

The present disclosure is generally related to robotic cleaners and more specifically related to dust cup shutter for a robotic cleaner.

BACKGROUND INFORMATION

Robotic cleaners (e.g., robotic vacuum cleaners) are configured to autonomously clean a surface. For example, a user of a robotic vacuum cleaner may locate the robotic vacuum cleaner in an environment and instruct the robotic vacuum cleaner to commence a cleaning operation. While cleaning, the robotic vacuum cleaner collects debris and deposits it in a dust cup for later disposal by a user. The robotic vacuum cleaner may be configured to automatically dock with a docking station to recharge one or more batteries powering the robotic vacuum cleaner and/or to empty the dust cup.

BRIEF DESCRIPTION OF THE DRAWINGS

These and other features and advantages will be better understood by reading the following detailed description, taken together with the drawings, wherein.

DETAILED DESCRIPTION

The present disclosure is generally directed to a robotic cleaner (e.g., a robotic vacuum cleaner). An example of a robotic cleaner, consistent with the present disclosure, includes a dust cup having a debris inlet and a debris outlet, an agitator configured to urge debris through the debris inlet of the dust cup, and a shutter that is transitionable between an evacuation position and a cleaning position. The shutter may be urged between the evacuation position and the cleaning position by rotation of the agitator. When the shutter transitions from the evacuation position to the cleaning position, an effective opening area (e.g., the area of the debris inlet through which air and/or debris may pass) of the debris inlet increases. Such a configuration may allow for the effective opening area to be maximized while cleaning such that debris can be more readily received in the dust cup. When the shutter transitions from the cleaning position to the evacuation position, the effective opening area decreases. Such a configuration may allow the dust cup to be more efficiently emptied using an external suction source fluidly coupled to the debris outlet of the dust cup (e.g., a velocity of air drawn through the debris inlet is increased which may cause debris within the dust cup to be more readily entrained in air flowing through the dust cup).

Figure 1A:
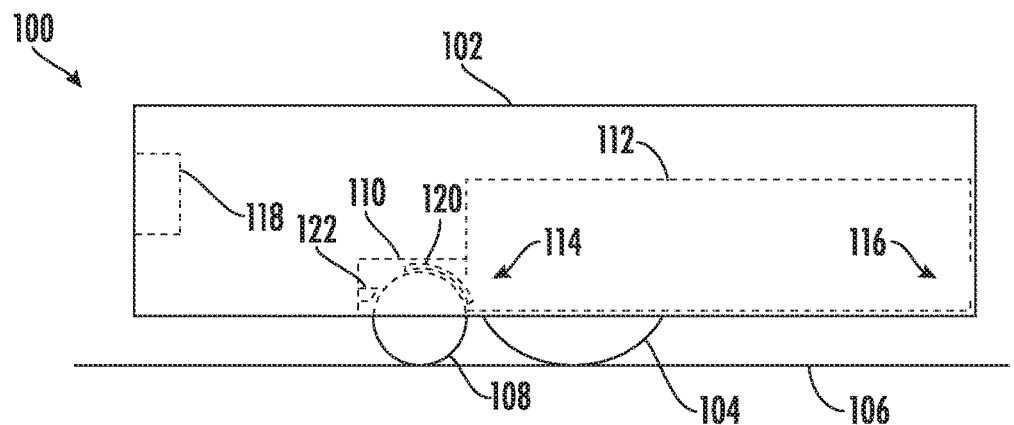
FIG. 1A is a schematic view of a robotic cleaner having a shutter in an evacuation position, consistent with embodiments of the present disclosure.
Figure 1B:
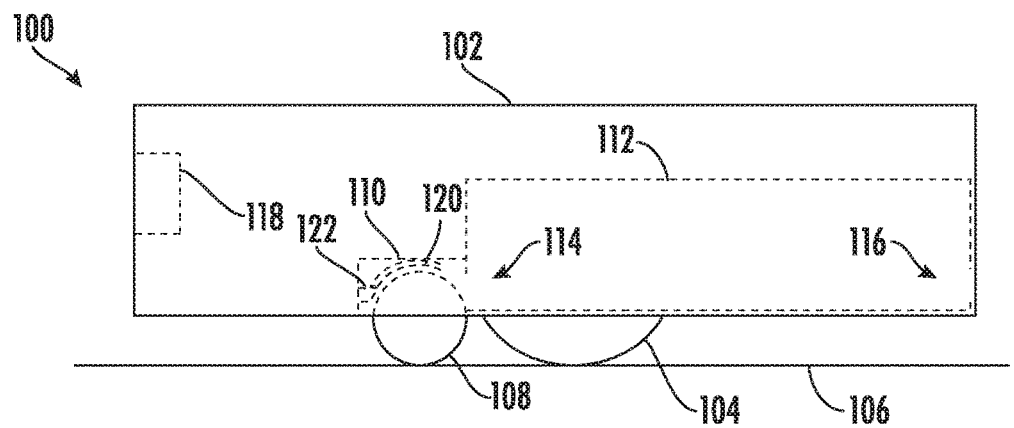
FIG. 1B is a schematic view of the robotic cleaner of FIG. 1A having the shutter in a cleaning position, consistent with embodiments of the present disclosure.

FIGS. 1A and 1B show a schematic side view of an example of a robotic cleaner 100. As shown, the robotic cleaner 100 includes a body 102, at least one driven wheel 104 coupled to the body 102 and configured to urge the body 102 across a surface to be cleaned 106, an agitator chamber 110 within the body 102, an agitator 108 (e.g., a brush roll having one or more bristle strips, bristle tufts, and/or flexible flaps) disposed within the agitator chamber 110 and configured to rotate about a rotation axis that extends parallel to the surface to be cleaned 106, a dust cup 112 removably coupled to the body 102 and fluidly coupled to the agitator chamber 110, the dust cup 112 having a debris inlet 114 fluidly coupling the dust cup 112 to the agitator chamber 110 and a debris outlet 116, and one or more sensors 118. A moveable shutter 120 extends within the agitator chamber 110 and is configured to transition between an evacuation position (e.g., as shown in FIG. 1A) and a cleaning position (e.g., as shown in FIG. 1B) in response to rotational movement of the agitator 108. When the shutter 120 transitions from the evacuation position towards the cleaning position, an effective opening area of the debris inlet 114 is increased. In other words, when the shutter 120 is in the cleaning position, the effective opening area of the debris inlet 114 is greater than the effective opening area of the debris inlet 114 when the shutter 120 is in the evacuation position. The effective opening area of the debris inlet 114 may generally be described as the area of the debris inlet 114 through which air and/or debris may pass.

As shown, the shutter 120 includes an arcuate portion that has a shape that generally corresponds to a shape of the agitator 108. As such, when the shutter 120 transitions between the evacuation and cleaning positions, the shutter 120 rotates about a rotation axis of the agitator 108. In some instances, the shutter 120 can be configured to rotate with the agitator 108 when transitioning between the evacuation and cleaning positions. In these instances, when the shutter 120 reaches the evacuation or cleaning position, the shutter 120 may engage a stop 122, a portion of the agitator chamber 110, and/or a portion of the dust cup 112, wherein the engagement prevents the shutter 120 from continuing to rotate with the agitator 108. In some instances, the agitator chamber 110 may include a plurality of stops 122, wherein the stops 122 are configured to restrict the movement of the shutter 120. For example, a first stop 122 corresponds to the cleaning position and a second stop 122 corresponds to the evacuation position such that a total movement distance of the shutter 120, when transitioning between the cleaning and evacuation positions, is defined by the stops 122.

To transition the shutter 120 towards the cleaning position, the agitator 108 may rotate in a forward rotation direction (e.g., counterclockwise). The forward rotation direction may generally correspond to a rotation direction of the agitator 108 that is configured to urge debris into the debris inlet 114 during a cleaning operation. To transition the shutter 120 towards the evacuation position, the agitator 108 may rotate in a reverse rotation direction (e.g., clockwise). The reverse rotation direction is opposite the forward rotation direction.

Figure 1C:
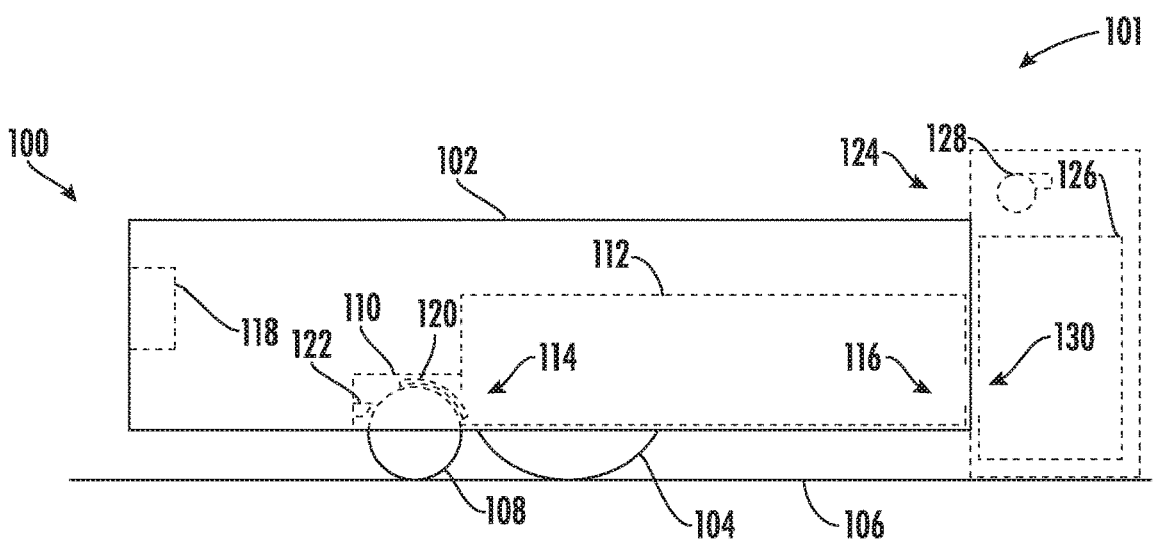
FIG. 1C is a schematic view of the robotic cleaner of FIG. 1A engaging a docking station, consistent with embodiments of the present disclosure.

FIG. 1C shows a schematic example of a robotic cleaning system 101, wherein the robotic cleaner 100 is configured to engage a docking station 124. The docking station 124 includes an evacuation bin 126 and a suction motor 128. In some instances, the docking station 124 may be configured to replenish (e.g., recharge) one or more power sources (e.g., batteries) of the robotic cleaner 100 when the robotic cleaner engages the docking station 124. The suction motor 128 is fluidly coupled to the evacuation bin 126 and the evacuation bin 126 is configured to be fluidly coupled to the dust cup 112 through a bin inlet 130 and the debris outlet 116. In other words, the evacuation bin 126, the suction motor 128, and the dust cup 112 are configured to be fluidly coupled to each other when the robotic cleaner 100 is engaging the docking station 124. As such, when the suction motor 128 is activated, debris stored in the dust cup 112 can be transferred from the dust cup 112 to the evacuation bin 126.

As shown, when the robotic cleaner 100 is engaging the docking station 124, the shutter 120 is in the evacuation position. The shutter 120 can be urged to the evacuation position by rotation of the agitator 108 in the reverse direction. For example, when engaging the docking station 124 but before the suction motor 128 is activated, the agitator 108 may be rotated in the reverse direction for a predetermined period of time to urge the shutter 120 to the evacuation position. When the shutter 120 is in the evacuation position, the suction motor 128 can be activated. In some instances, the suction motor 128 can be activated while the shutter 120 is being transitioned to the evacuation position. For example, the suction motor 128 can be activated for a predetermined period of time before the shutter 120 is transitioned to the evacuation position or the shutter 120 can be transitioned to the evacuation position concurrently with activation of the suction motor 128.

When the shutter 120 is in the evacuation position, the effective area of the debris inlet 114 is reduced. For example, when the shutter 120 is in the evacuation position, the effective area of the debris inlet 114 may be reduced by less than 100% and at least 50%, 60%, 70%, 80%, 90%, 95%, or 99% when compared to the effective area of the debris inlet 114 when the shutter 120 is in the cleaning position. Such a configuration may increase a velocity of air flowing through the debris inlet 114 when the suction motor 128 is activated. This may allow debris to be more readily entrained within air flowing through the dust cup 112 during evacuation of the dust cup 112. In some instances, the effective area may be reduced by 100% such that the debris inlet 114 is closed. Such a configuration may prevent air from flowing through the debris inlet 114 when the suction motor 128 is activated.

Figure 2A:
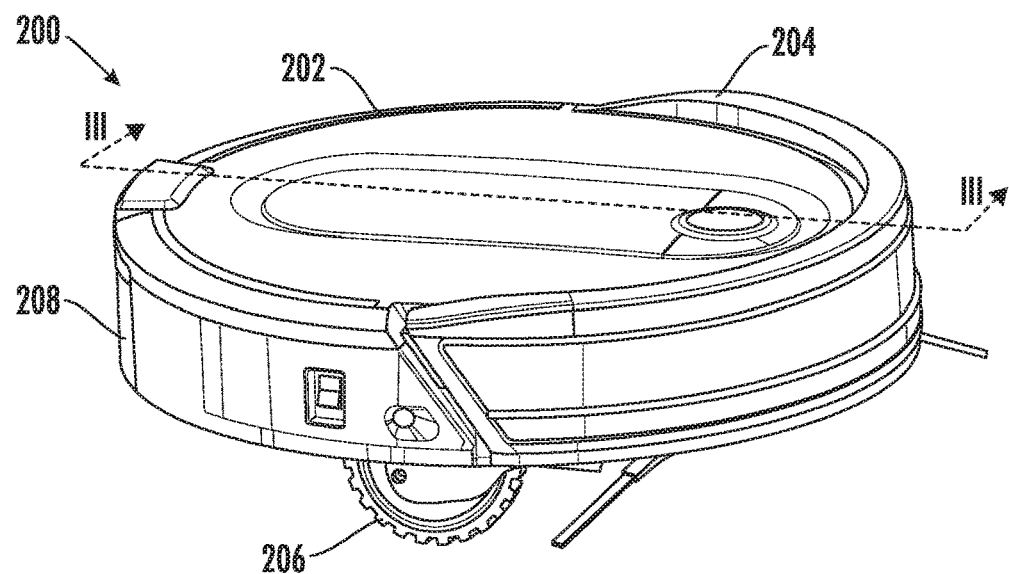
FIG. 2A is a perspective view of a robotic cleaner, consistent with embodiments of the present disclosure.
Figure 2B:
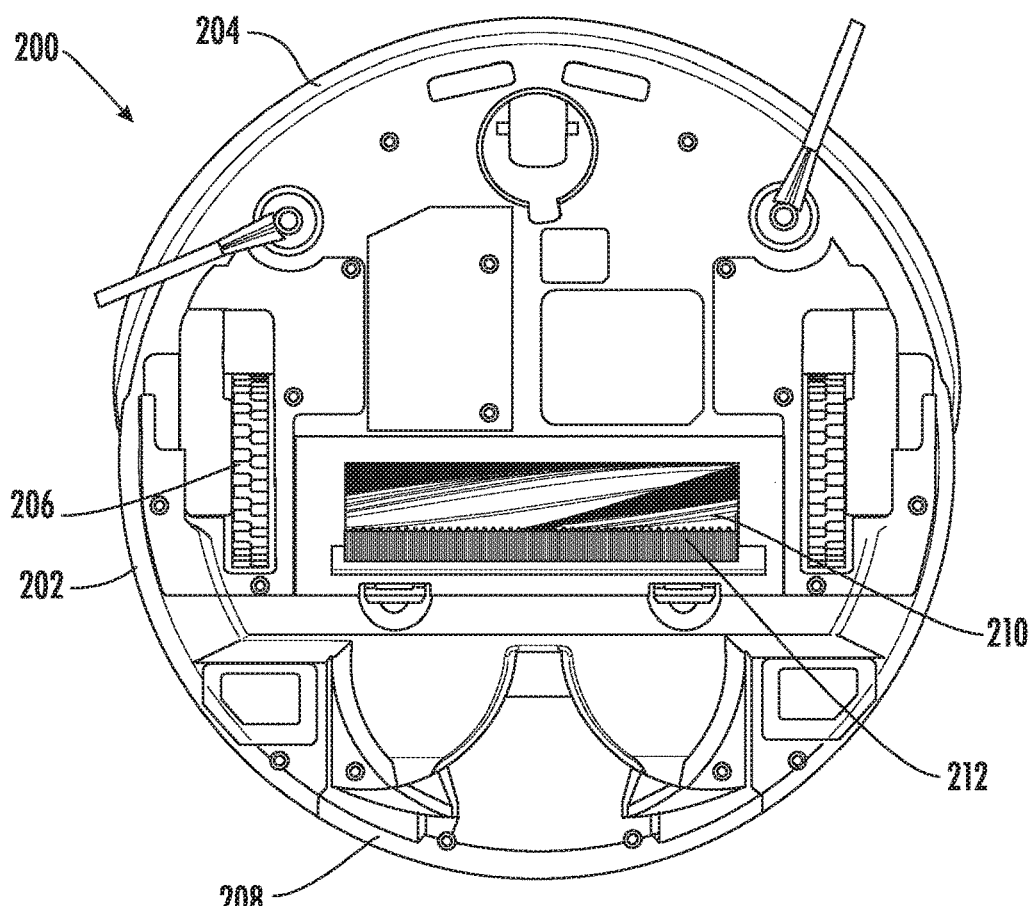
FIG. 2B is a bottom view of the robotic cleaner of FIG. 2A, consistent with embodiments of the present disclosure.

FIG. 2A shows a perspective view of a robotic cleaner 200, which may be an example of the robotic cleaner 100 of FIGS. 1A-1C. FIG. 2B shows a bottom view of the robotic cleaner 200. As shown, the robotic cleaner 200 includes a body 202, a bumper 204 moveably coupled to the body 202, a plurality of driven wheels 206 configured to be independently driven, a dust cup 208, and at least one agitator 210. As shown, a bristle strip 212 may extend in a direction generally parallel to the agitator 210 and be positioned between at least a portion of the agitator 210 and at least a portion of the dust cup 208.

Figure 3A:
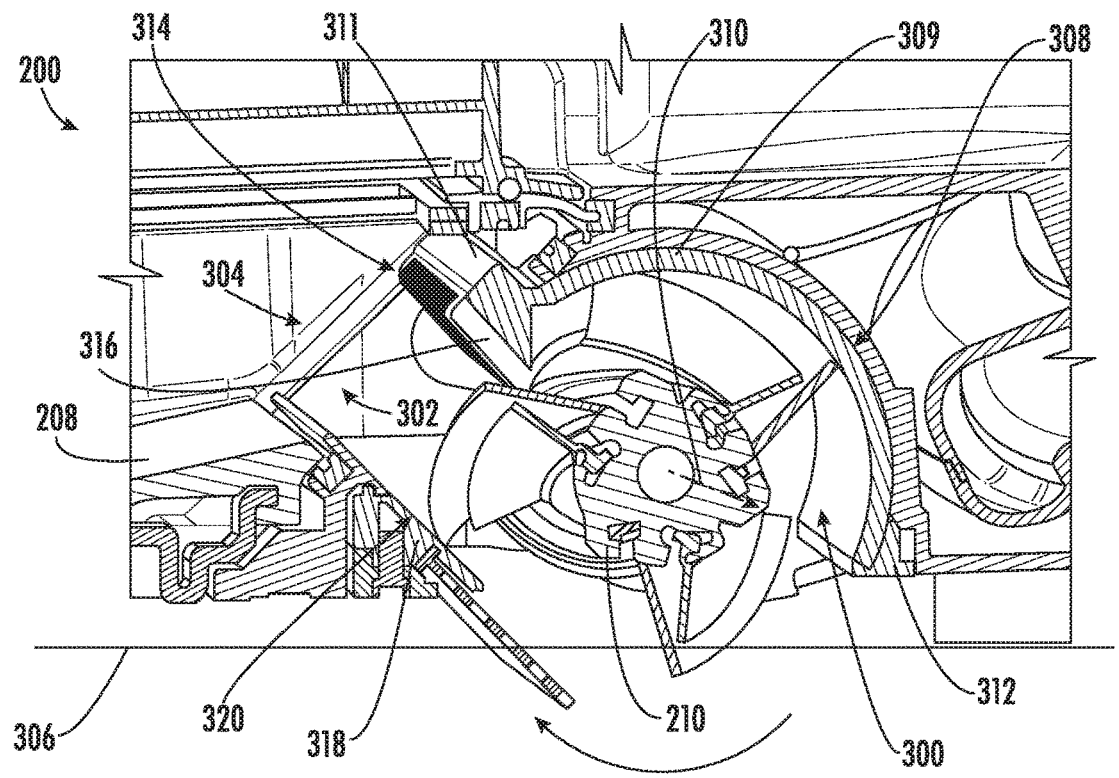
FIG. 3A is a cross-sectional view of a portion of the robotic cleaner of FIG. 2A taken along the line III-III, wherein the robotic cleaner includes a shutter in a cleaning position, consistent with embodiments of the present disclosure.
Figure 3B:
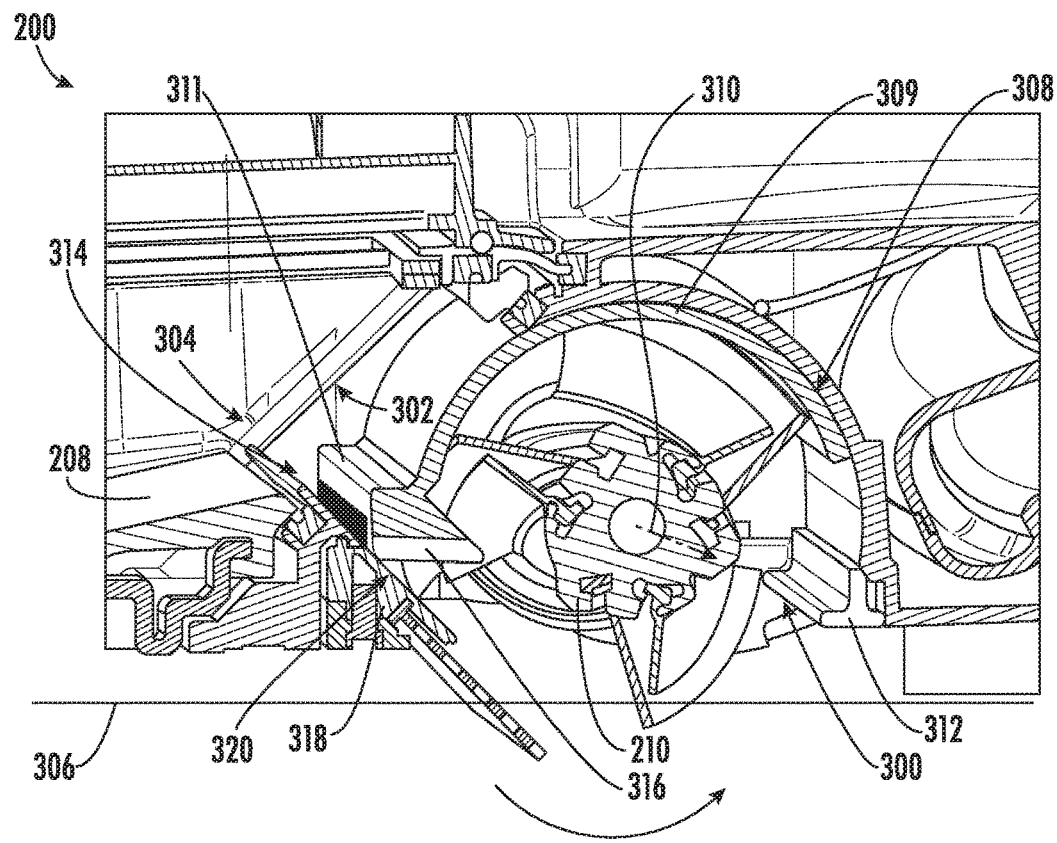
FIG. 3B is another cross-sectional view of the robotic cleaner of FIG. 2A taken along the line III-III, wherein the shutter is in an evacuation position, consistent with embodiments of the present disclosure.

FIGS. 3A and 3B show a cross-sectional perspective view of a portion of the robotic cleaner 200 of FIGS. 2A and 2B taken along the line III-III of FIG. 2A. As shown, the robotic cleaner 200 includes an agitator chamber 300. The agitator chamber 300 defines a chamber outlet 302 that is fluidly coupled to a debris inlet 304 of the dust cup 208. The agitator chamber 300 includes the agitator 210 and the agitator 210 is configured to rotate within the agitator chamber 300. A portion of the agitator 210 extends from the agitator chamber 300 such that a portion of the agitator can engage (e.g., contact) a surface to be cleaned 306. The agitator chamber 300 includes a moveable shutter 308 that is configured to transition between a cleaning position (e.g., as shown in FIG. 3A) and an evacuation position (e.g., as shown in FIG. 3B).

As shown, the shutter 308 has an arcuate portion 309 that generally corresponds to a shape of the agitator 210 and a non-arcuate portion 311. As such, when the shutter 308 transitions between the cleaning and evacuation positions, the shutter 308 rotates about a rotation axis 310 of the agitator 210. In some instances, the shutter 308 is configured to engage the agitator 210 such that the shutter 308 rotates with the agitator 210. For example, the non-arcuate portion 311 can be configured to engage (e.g., contact) a portion of the agitator 210 such that the shutter 308 can be urged between the cleaning and evacuation positions in response to engagement between non-arcuate portion 311 and the agitator 210. The agitator chamber 300 can include a cleaning stop 312 which is configured to prevent continued rotation of the shutter 308 beyond a predetermined location within the agitator chamber 300. For example, when in the cleaning position, the shutter 308 can engage the cleaning stop 312 such that further rotation of the shutter 308 with the agitator 210 is prevented.

The shutter 308 can be configured to be rotated from the evacuation position towards the cleaning position in response to rotation of the agitator 210 in a forward rotation direction (i.e., the rotation direction of the agitator 210 used for cleaning purposes). The non-arcuate portion 311 can be configured to engage (e.g., contact) the agitator 210 such that the engagement causes the shutter 308 to transition to the cleaning position. In some instances, the non-arcuate portion 311 can include a comb 314 having a plurality of teeth 316 spaced apart by a separation distance. The teeth 316 are configured to engage the agitator 210 such that fibrous debris (e.g., hair or string) entangled on the agitator 210 are removed therefrom during rotation of the agitator 210. The separation distance extending between immediately adjacent teeth 316 can be configured such that, when the shutter 308 is in the evacuation position, the effective opening area of the debris inlet 304 of the dust cup 208 is defined, at least in part, by (e.g., entirely by) the separation distance extending between the teeth 316.

The shutter 308 can be configured to be rotated from the cleaning position towards the evacuation position in response to rotation of the agitator 210 in a reverse rotation direction (i.e., a direction that is opposite the forward rotation direction). When in the evacuation position, the non-arcuate portion 311 of the shutter 308 engages (e.g., contacts) a portion of the agitator chamber 300 such that further rotation of the shutter 308 with the agitator 210 is prevented. For example, the teeth 316 of the comb 314 may engage (e.g., contact) the agitator chamber 300 at an evacuation stop 318 such that airflow paths are defined between immediately adjacent teeth 316 and an inner surface 320 of the agitator chamber 300 defining the evacuation stop 318. As such, the effective opening area of the debris inlet 304 is reduced when the shutter 308 transitions to the evacuation position. Such a configuration may increase a velocity of air flowing through the debris inlet 304 when the dust cup 208 is evacuated by an external suction source. Increasing the airflow velocity may improve the efficiency of debris removal from the dust cup 208 and/or improve the efficiency of fibrous debris is removal from the comb 314.

In operation, when the robotic cleaner 200 docks with a docking station capable of evacuating the dust cup 208 (e.g., the docking station 124 of FIG. 1C), the shutter 308 can be transitioned from the cleaning position to the evacuation position before the docking station begins evacuating the dust cup 208 or during the evacuation of the dust cup 208. When the shutter 308 transitions to the evacuation position during the evacuation of the dust cup 208 air drawn in through the debris inlet 304 experiences a dynamic velocity change for at least a portion of the evacuation, which may aid in debris evacuation from the dust cup 208.

Figure 4:
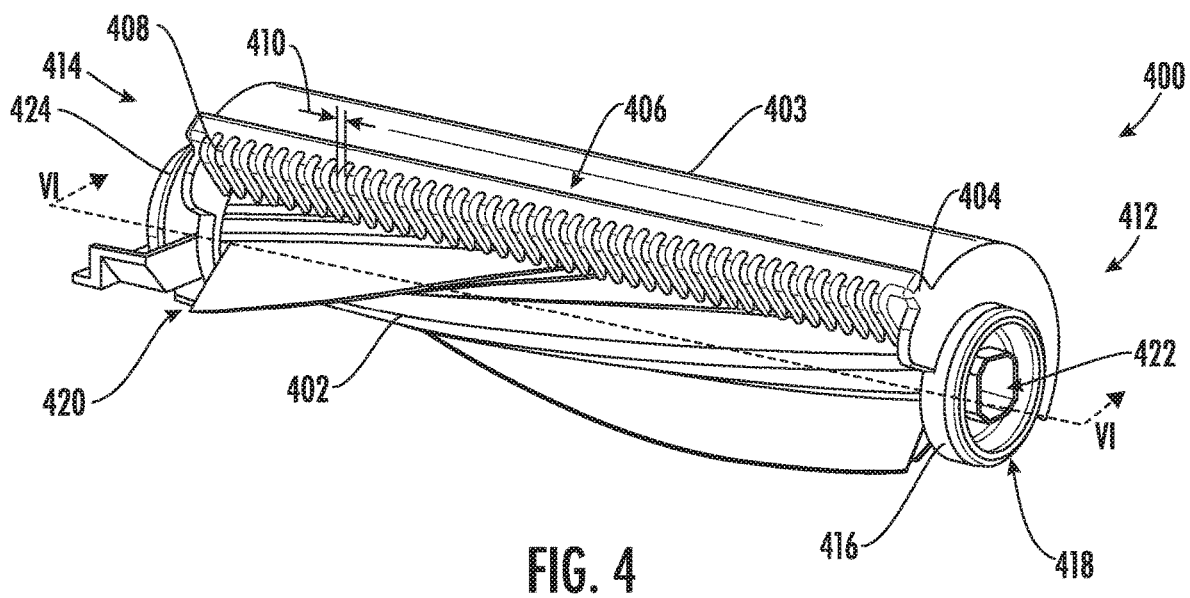
FIG. 4 is a perspective view of a shutter rotatably coupled to an agitator, consistent with embodiments of the present disclosure.
Figure 5:
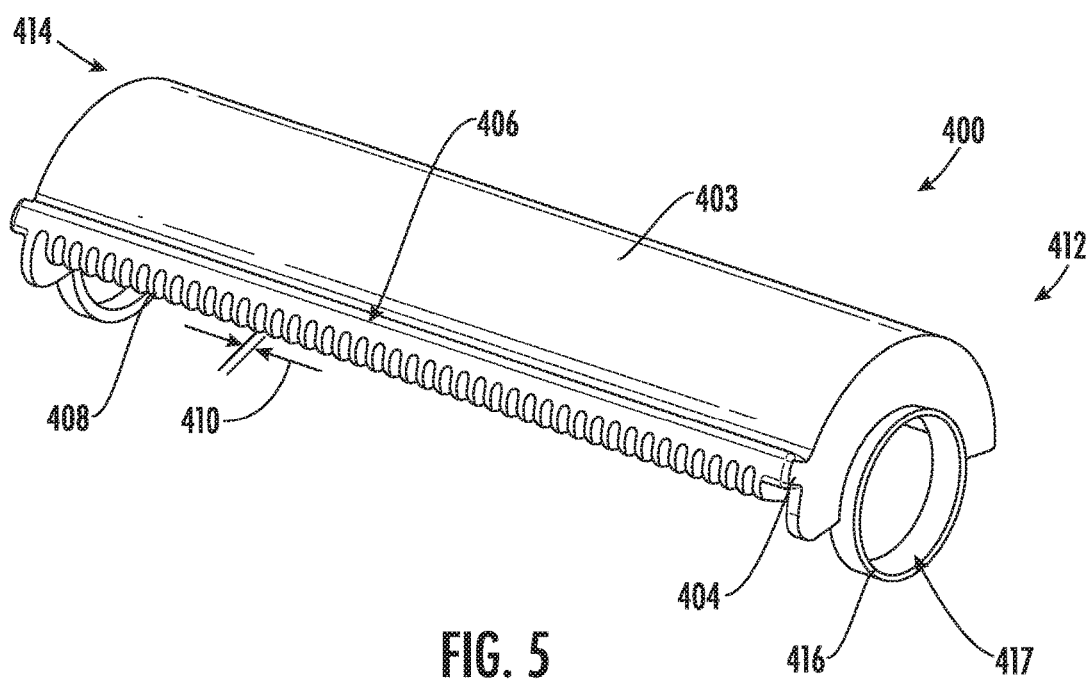
FIG. 5 is a perspective view of the shutter of FIG. 4 removed from the agitator, consistent with embodiments of the present disclosure.

FIG. 4 shows a perspective view a shutter 400, which may be an example of the shutter 308 of FIGS. 3A and 3B, rotatably coupled to an agitator 402, which may be an example of the agitator 210 of FIG. 2B. FIG. 5 shows a perspective view of the shutter 400 removed from the agitator 402. As shown, the shutter 400 includes an arcuate portion 403 and a non-arcuate portion 404. The non-arcuate portion 404 defines a comb 406 having a plurality of teeth 408 spaced apart by a separation distance 410. The separation distance 410 is measured between immediately adjacent teeth 408. The longitudinal distal end regions 412 and 414 of the shutter 400 define collars 416 having openings 417 that are configured to rotatably receive a portion of the agitator 402. The agitator 402 is configured to be coupled to the shutter 400 via the collars 416 such that the shutter 400 rotates with the agitator 402 for a predetermined rotation distance (e.g., until the shutter engages the cleaning stop 312 or the evacuation stop 318) and, after rotating the predetermined distance, the agitator 402 rotates relative to the shutter 400. When the shutter 400 and agitator 402 rotate together, the shutter 400 and the agitator 402 may rotate at different rates (e.g., a rate of rotation for the shutter 400 may measure less than a rate of rotation for the agitator 402).

As shown, the agitator 402 includes a driven end 418 and a non-driven end 420. The driven end 418 is configured to be connected to a drive motor and the non-driven end 420 is configured to be rotatably coupled to the agitator chamber 300. For example, the driven end 418 may include a socket 422 configured to receive a drive shaft connected to the drive motor (e.g., via a plurality of gears) and the non-driven end 420 may be rotatably coupled to a connecting member 424, wherein the connecting member 424 is configured to be fixedly (non-rotatably) coupled to the agitator chamber 300.

Figure 6:
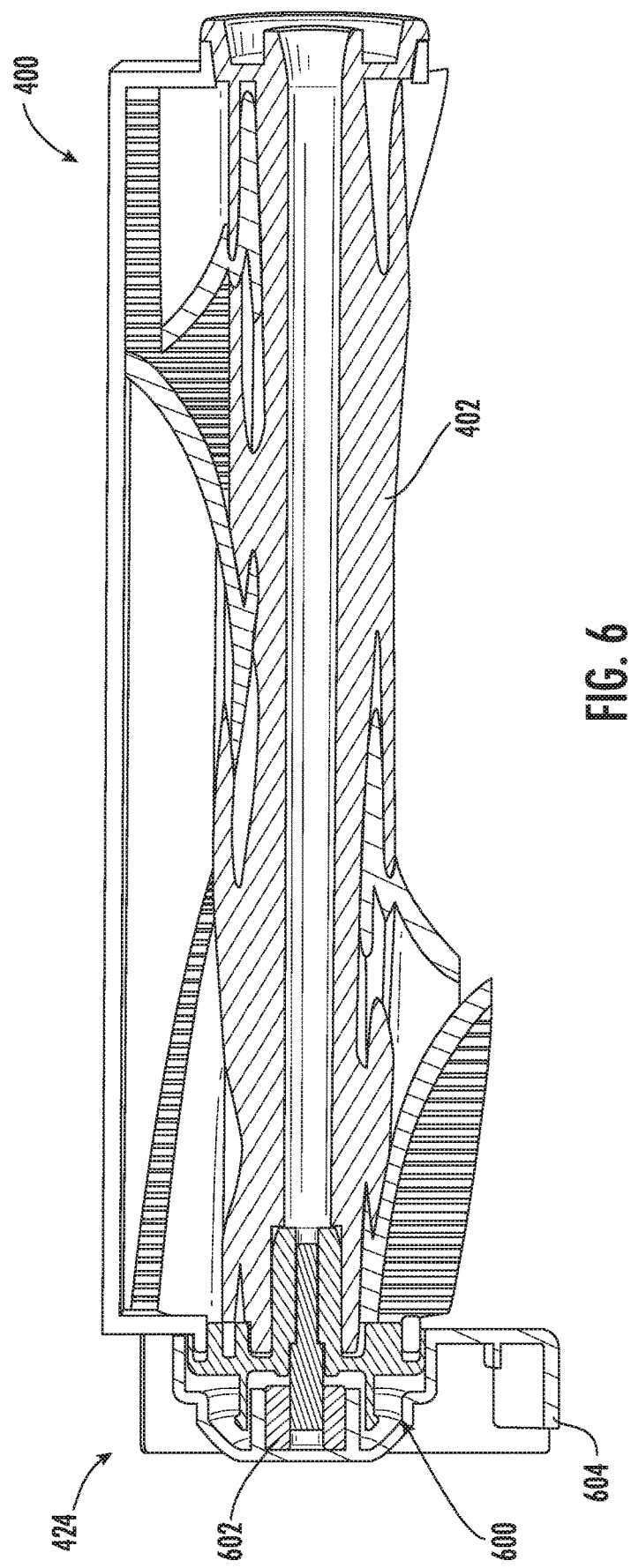
FIG. 6 shows a cross-sectional view of the agitator of FIG. 4 taken along the line VI-VI, consistent with embodiments of the present disclosure.

FIG. 6 shows a cross-sectional view of the shutter 400 and the agitator 402 taken along the line VI-VI of FIG. 4. As shown, the connecting member 424 defines a connector cavity 600 for receiving the non-driven end 420 of the agitator 402. The connecting member 424 may include a bearing 602 disposed within the connector cavity 600 that is configured to extend around a portion of the agitator 402. The connecting member 424 may also include a lift tab 604 configured to facilitate coupling of the agitator 402 to the agitator chamber 300 and removal of the agitator 402 from the agitator chamber 300.

Figure 7:
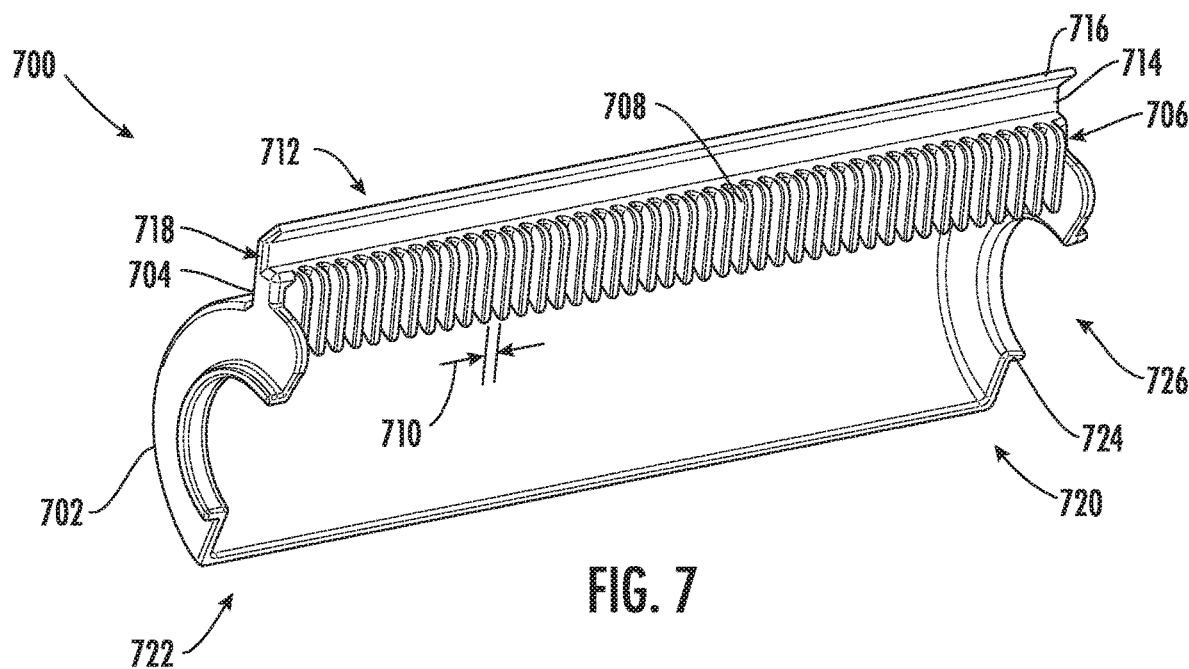
FIG. 7 is a perspective view of a shutter, consistent with embodiments of the present disclosure.
Figure 8:
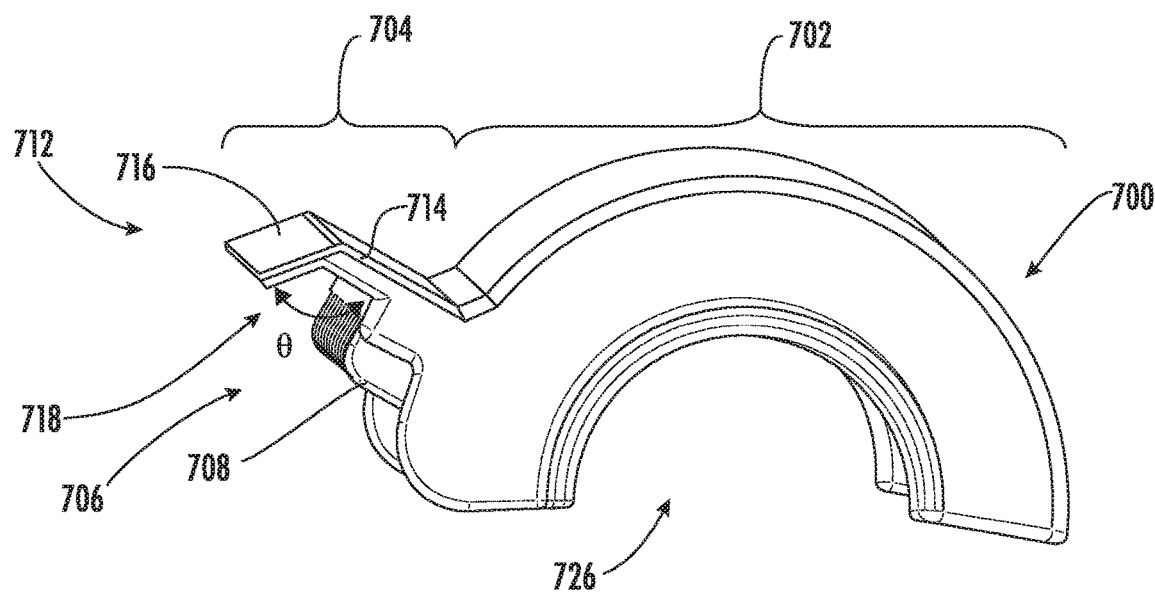
FIG. 8 is a perspective end view of the shutter of FIG. 7, consistent with embodiments of the present disclosure.

FIG. 7 shows a perspective view of a shutter 700, which may be an example of the shutter 120 of FIGS. 1A-1C. FIG. 8 shows a perspective end view of the shutter 700. As shown, the shutter 700 includes an arcuate portion 702 and a non-arcuate portion 704. The arcuate portion 702 is configured to have a shape that generally corresponds to a shape of an agitator (e.g., the agitator 108) such that the shutter 700 can rotate about a rotation axis of the agitator. The non-arcuate portion 704 includes a comb 706 having a plurality of teeth 708 spaced a part by a separation distance 710. The non-arcuate portion 704 may also include a shroud 712 having a first sidewall 714 and a second sidewall 716. The first and second sidewalls 714 and 716 define at least a portion of a channel 718. The channel 718 extends between the second sidewall 716 and at least a portion of the comb 706. As shown, the second sidewall 716 can extend from the first sidewall 714 at a non-perpendicular angle θ (e.g., an angle measuring greater than 90°. As such, the channel 718 may generally be described as having a non-rectangular cross-section (e.g., a trapezoidal cross-section) with at least one open side.

The shroud 712 can be configured to redirect air incident thereon. For example, when the shutter 700 is in an evacuation position, the shroud 712 can be configured to extend over a portion of the debris inlet of the dust cup. As such, air incident on the second sidewall 716 is urged towards the effective opening area of the debris inlet by the second sidewall 716.

As shown, longitudinal distal end regions 720 and 722 of the shutter 700 define collars 724 configured to receive a portion of an agitator. The collars 724 are configured such that the shutter 700 can rotate with the agitator when transitioning between the evacuation and cleaning positions and such that the agitator can rotate relative to the collars 724 when the shutter 700 is in one of the evacuation position or the cleaning position. As shown, the collars 724 have an open end 726 such that the collars 724 have a semicircular shape that extends around a portion of the agitator. In some instances, when the agitator is received within the open ends 726 of the collars 724, the collars 724 extend around 50% or less of the circumference of the agitator. Alternatively, when the agitator is received within the open ends 726 of the collars 724, the collars 724 extend around greater than 50% but less than 100% of the circumference of the agitator such that the agitator is rotatably coupled to the shutter 700 as a result of the collar 724 extending around the agitator. In other words, the collars 724 can generally be described as extending around only a portion of the agitator.

In some instances, the shutter 700 may be moveably coupled to the agitator chamber (e.g., the agitator chamber 110) such that the shutter 700 can move relative to the agitator chamber when transitioning between the evacuation and cleaning positions. In some instances, the shutter 700 may be configured to float between the agitator and the agitator chamber. In other words, the shutter 700 is held in place by being positioned between the agitator and an inner surface the agitator chamber.

Figure 9:
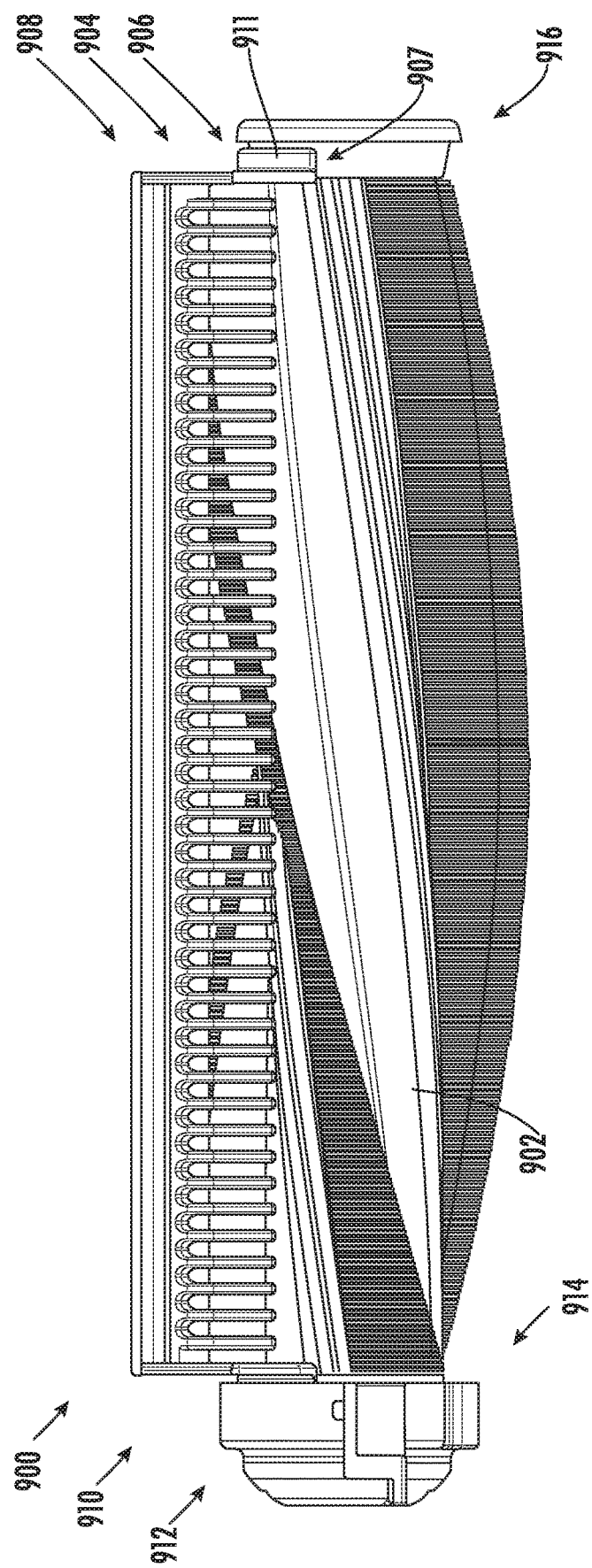
FIG. 9 shows a side view of a shutter rotatably coupled to an agitator, consistent with embodiments of the present disclosure.

FIG. 9 shows a side view of a shutter 900, which may be an example of the shutter 700 of FIG. 7, moveably coupled to an agitator 902, which may be an example of the agitator 108 of FIGS. 1A-1C. As shown, the shutter 900 includes a comb 904 and is moveably coupled to the agitator 902 such that the shutter 900 can transition between the cleaning and evacuation positions. The shutter 900 defines collars 906 having open ends 907 at opposing distal end regions 908 and 910 of the shutter 900. The collars 906 are configured to receive a portion of the agitator 902 such that the agitator 902 rotates relative to the collars 906 when the shutter 900 is in one of the cleaning or evacuation position.

The collars 906 extend around only a portion of the agitator 902 and define a flange 911. The flange 911 can be configured to moveably couple the shutter 900 to the agitator chamber (e.g., the agitator chamber 110). For example, a first flange 911 can be at least partially received within a connecting member 912 and a second flange 911 can be at least partially received within a drive cavity of the agitator chamber (e.g., as discussed in relation to FIG. 10). As such, the shutter 900 may generally be described as being configured to be float between the agitator 902 and the agitator chamber. By way of further example, the flanges 911 can slideably couple the shutter 900 to the agitator chamber or the agitator 902 by being received within corresponding slots defined within the agitator chamber or the agitator 902. The connecting member 912 is configured to rotatably couple to a non-driven end 914 of the agitator 902 and fixedly (non-rotatably) couple to the agitator chamber such that the agitator 902 can rotate relative to the agitator chamber. The drive cavity is configured to at least partially receive a driven end 916 of the agitator 902 such that the agitator 902 can be caused to rotate.

Figure 10:
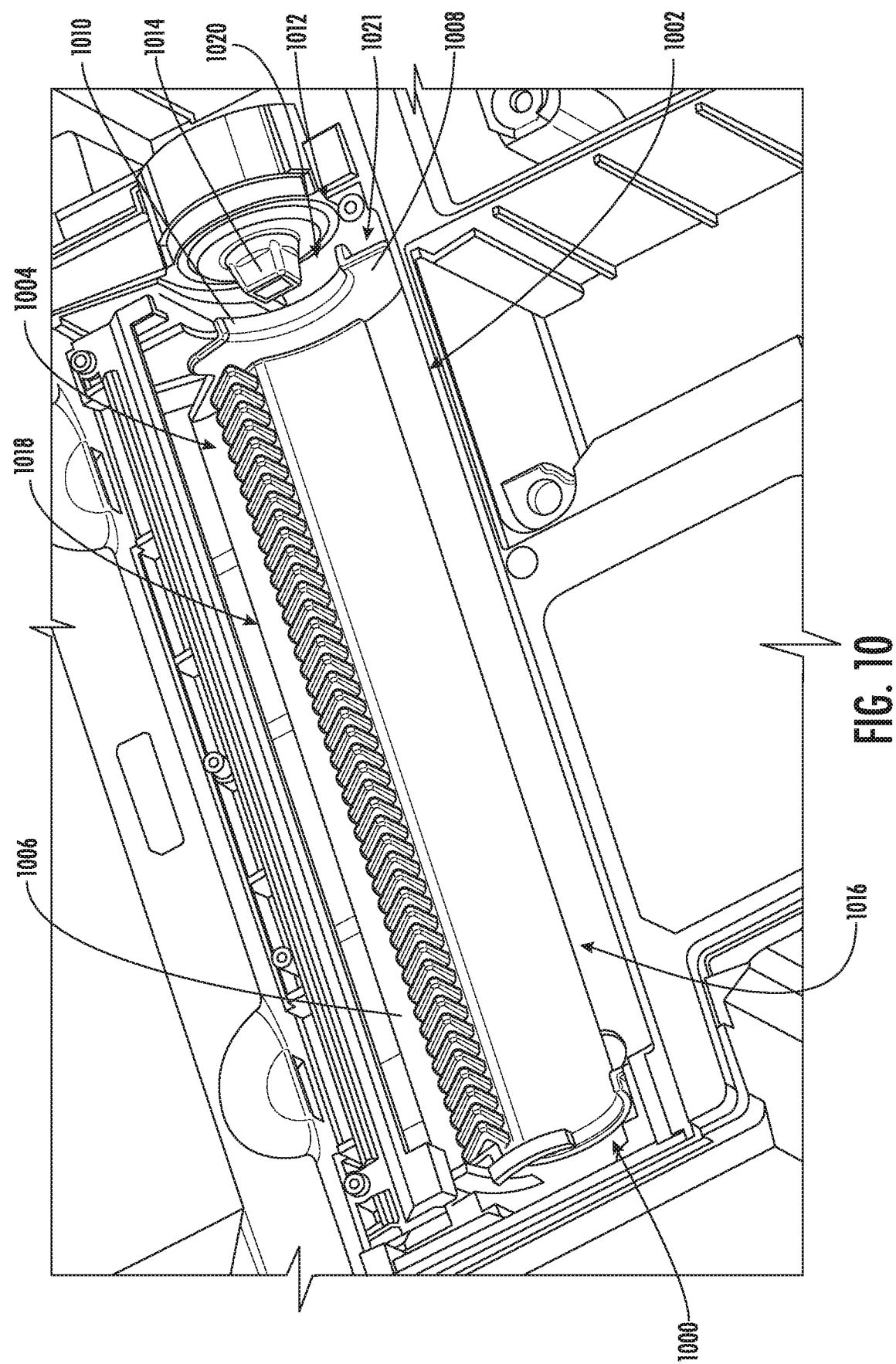
FIG. 10 shows a perspective view of a shutter received within an agitator chamber, consistent with embodiments of the present disclosure.

FIG. 10 shows a perspective view of a shutter 1000, which may be an example of the shutter 700 of FIG. 7, received within an agitator chamber 1002, which may be an example of the agitator chamber 110 of FIGS. 1A-1C. As shown, the shutter 1000 includes a comb 1004 and a shroud 1006. The shutter 1000 defines collars 1008 and each collar 1008 includes a corresponding flange 1010 extending therefrom. The flanges 1010 are configured retain the shutter 1000 in floating engagement between an agitator (e.g., the agitator 108) and the agitator chamber 1002. For example, a first flange 1010 can be configured to be received within a connecting member (e.g., as discussed in relation to FIG. 9) and a second flange 1010 can be configured to be received within a drive cavity 1012 defined in the agitator chamber 1002. The drive cavity 1012 includes a drive shaft 1014 configured to engage a driven end of the agitator such that the agitator rotates with the drive shaft 1014.

As also shown, the shutter 1000 includes an arcuate portion 1016 and a non-actuate portion 1018. The arcuate portion 1016 is configured to have a shape that generally corresponds to that of an agitator. As such, the shutter 1000 can rotate about a rotation axis of the agitator between the evacuation position and the cleaning position. In some instances, and as shown, the arcuate portion 1016 extends between opposing sides 1021 of open ends 1020 of the collars 1008. In other words, the arcuate portion 1016 may be spaced apart from both sides 1021 of the open ends 1020. In other instances, the arcuate portion 1016 my extend from a first side 1021 of the open ends 1020 of the collars 1008 in a direction of the second side 1021 of the open end 1020. In other words, the arcuate portion 1016 may be spaced apart from only one side 1021 of the open ends 1020 (see, e.g., FIG. 7).

Figure 11:
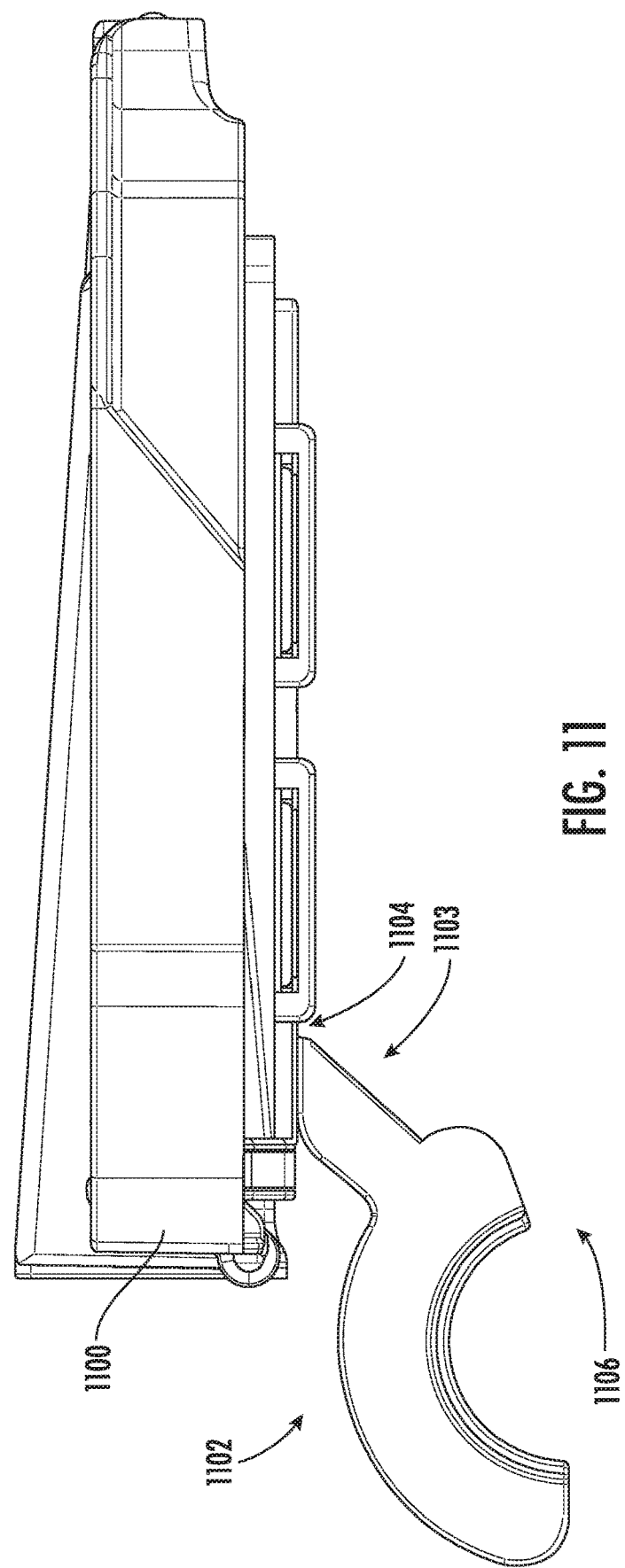
FIG. 11 shows a side view of a top portion of a dust cup and a shutter, consistent with embodiments of the present disclosure.

FIG. 11 shows a side view of a top portion of a dust cup 1100 (e.g., an openable cover) of a robotic cleaner engaged with a shutter 1102, which may be an example of the shutter 700 of FIG. 7. When transitioning to the evacuation position, the shutter 1102 rotates relative to the top portion of the dust cup 1100 until at least a portion of the shutter 1102 (e.g., at least a portion of a comb 1103) engages with an internal surface 1104 of the top portion of the dust cup 1100. An inlet aperture 1106 of the dust cup 1100 is below the engagement of the shutter 1102 and the top portion of the dust cup 1100. The shutter 1102 is configured to adjust the effective opening area of the inlet aperture 1106 by transitioning between the evacuation position and the cleaning position.

Figure 12:
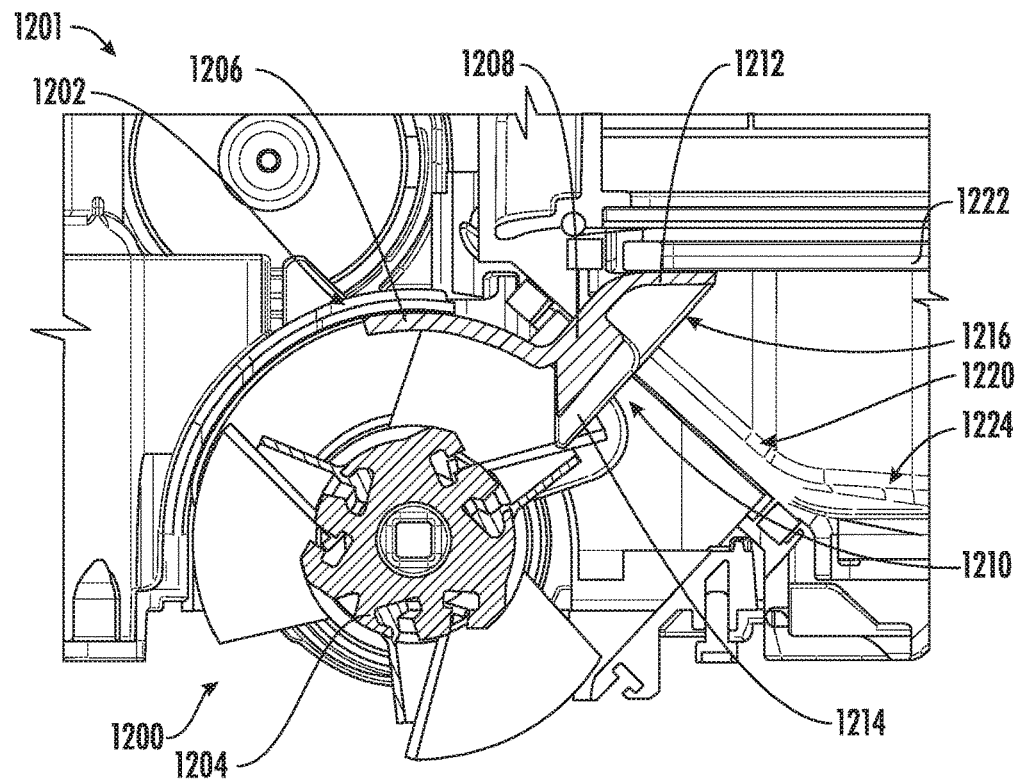
FIG. 12 shows a cross-sectional view of a portion of a robotic cleaner having a shutter in a cleaning position, consistent with embodiments of the present disclosure.
Figure 13:
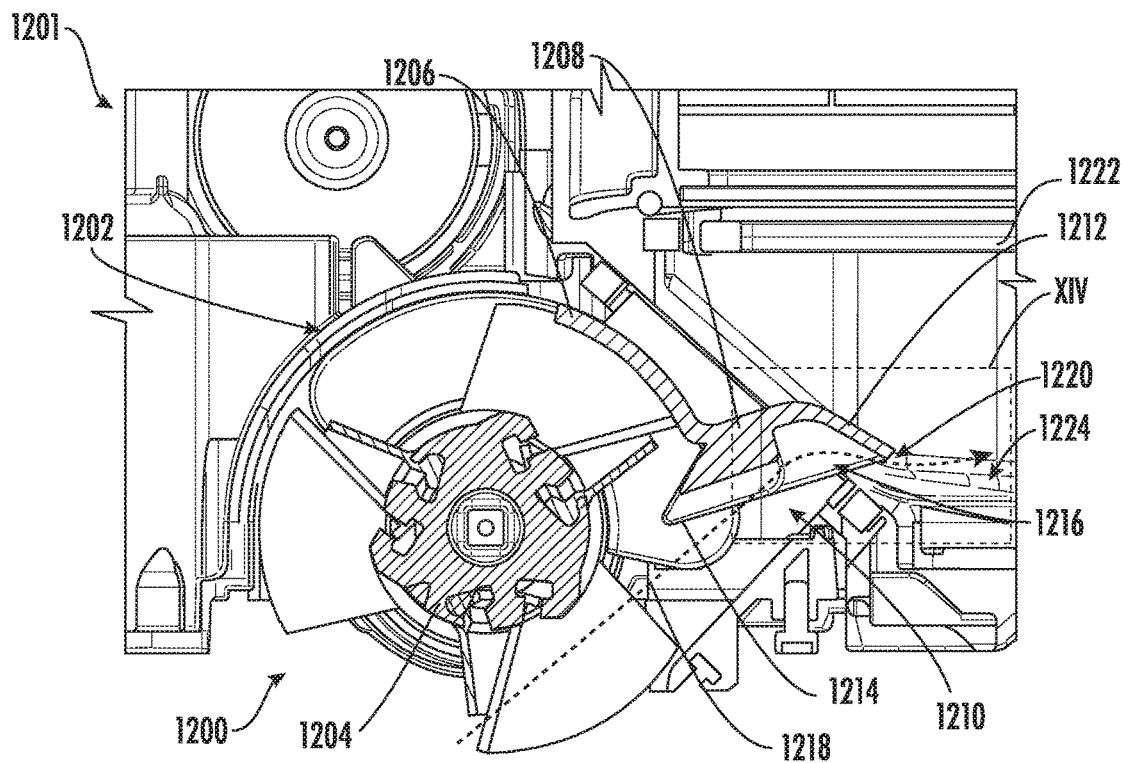
FIG. 13 shows a cross-sectional view of the portion of the robotic cleaner of FIG. 12, wherein the shutter is in an evacuation position, consistent with embodiments of the present disclosure.
Figure 14:
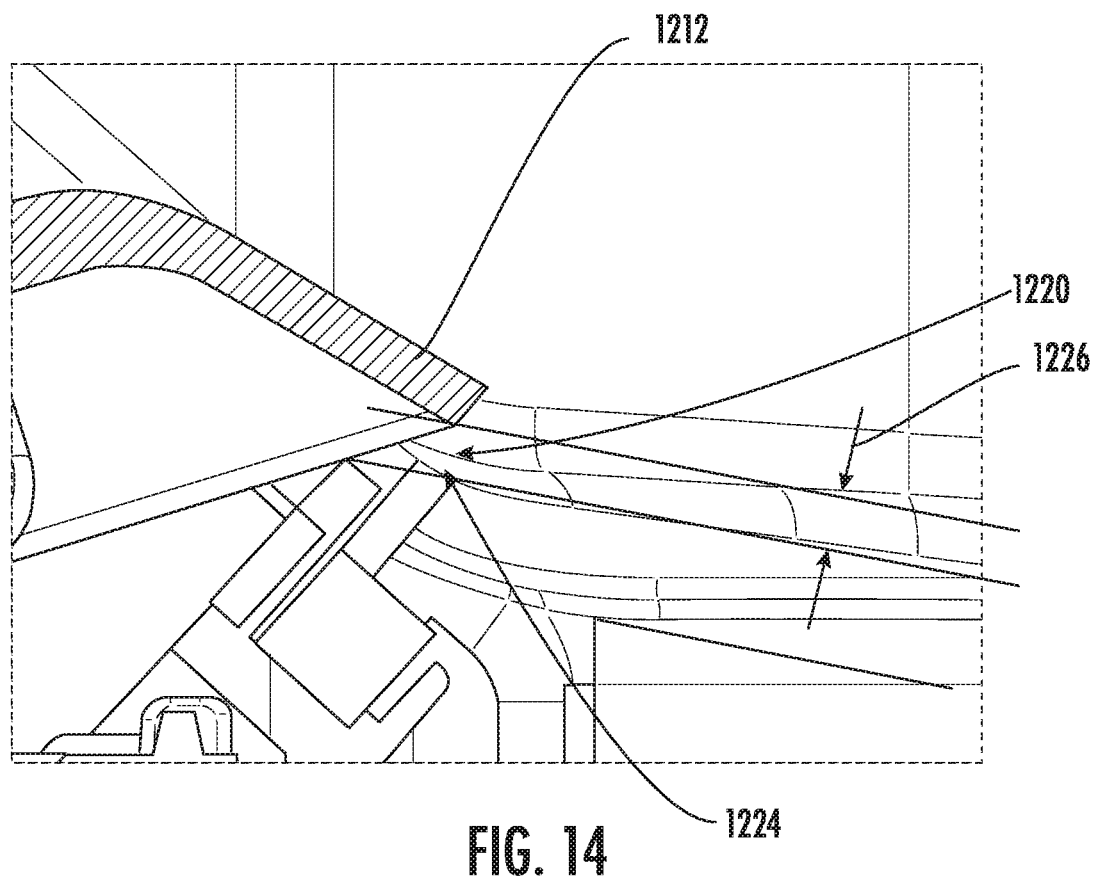
FIG. 14 shows a magnified view corresponding to region XIV of FIG. 13, consistent with embodiments of the present disclosure.

FIGS. 12 and 13 show a cross-sectional view of a portion of a robotic cleaner 1201, which may be an example of the robotic cleaner 100 of FIGS. 1A-1C, proximate an agitator chamber 1200. FIG. 14 shows a magnified view corresponding to region XIV of FIG. 13. The agitator chamber 1200 includes a shutter 1202, which may be an example of the shutter 1000 of FIG. 10. The shutter 1202 is configured to transition between a cleaning position (e.g., as shown in FIG. 12) and an evacuation position (e.g., as shown in FIG. 13) in response to rotational movement of an agitator 1204.

The shutter 1202 includes an arcuate portion 1206 and a non-arcuate portion 1208. The arcuate portion 1204 has a shape that generally corresponds to a shape of the agitator 1204 such that the shutter 1202 can rotate about a rotation axis of the agitator 1204 between the cleaning and evacuation positions. As shown, the arcuate portion 1206 extends around only a portion of the agitator 1204 (e.g., the arcuate portion 1206 can extend around less than 25%, 30%, 35%, 40% or 45% of the agitator 1204).

The non-arcuate portion 1208 includes a comb 1210 and a shroud 1212. The comb 1210 includes a plurality of teeth 1214 spaced apart by a separation distance such that air can pass between immediately adjacent teeth. As such, when the shutter 1202 is in the evacuation position, air can flow along an airflow path extending 1218 between the teeth 1214 and into a channel 1216 defined by the shroud 1212. The channel 1216 is shaped to urge air incident thereon into a debris inlet 1220 of a dust cup 1222 fluidly coupled to the agitator chamber 1200. In other words, the shroud 1212 is configured to redirect air incident thereon in a direction of an effective opening area of the debris inlet 1220 of the dust cup 1222.

Figure 15:
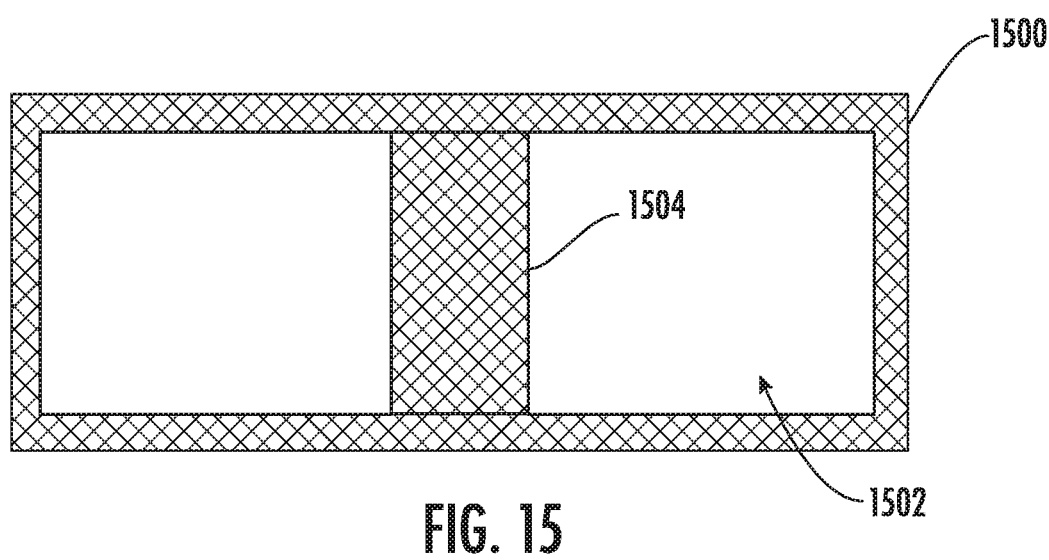
FIG. 15 shows a schematic example of a dust cup having a plurality of debris inlets, consistent with embodiments of the present disclosure.

As shown, when the shutter 1202 transitions from the cleaning position to the evacuation position, the shroud 1212 approaches a bottom surface 1224 of the dust cup 1222 such that an effective opening area of the debris inlet 1220 is reduced. For example, when in the evacuation position, the shroud 1212 may be spaced apart from the bottom surface 1224 of the dust cup 1222 such that an effective opening area height 1226 measures in a range of 1 millimeters (mm) to 5 mm. By way of further example, when in the evacuation position, the effective opening area height 1226 may measure 1 mm. As shown, when the shutter transitions from the evacuation position to the cleaning position, the shroud 1212 moves away from the bottom surface 1224 of the dust cup 1222 such that the effective opening area of the debris inlet 1220 is increased. An effective opening area width may measure in a range of 40 mm to 153 mm. In some instances, a plurality of debris inlets 1220 can engage with the shutter 1202 on either side of the dust cup 1222. For example, as shown in FIG. 15, a dust cup 1500 may include a plurality of debris inlets 1502 separated by a divider 1504 such that the debris inlets 1502 are disposed on opposite sides of the dust cup 1500.

Figure 16:
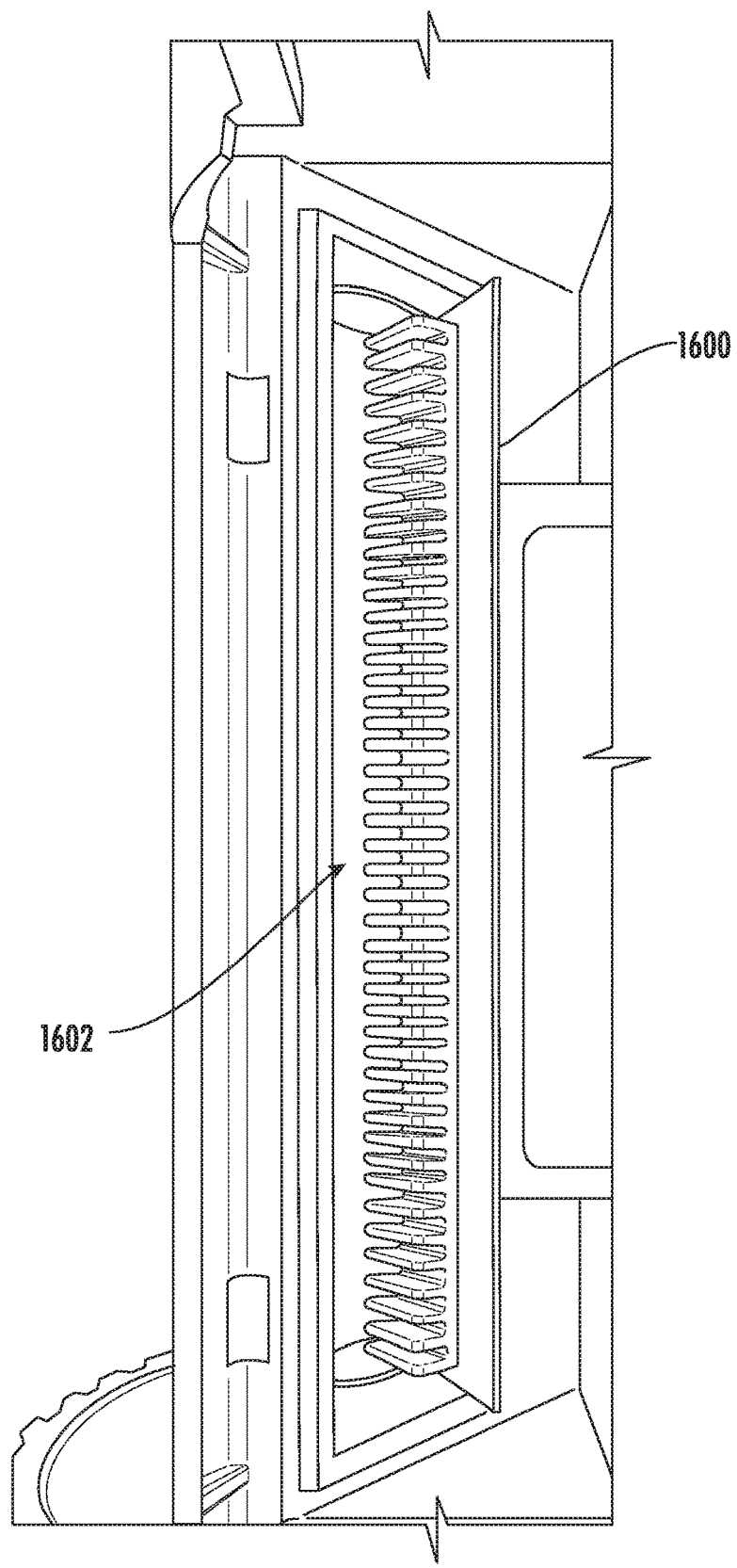
FIG. 16 shows a perspective view of an example of a shutter in a cleaning position, consistent with embodiments of the present disclosure.
Figure 17:
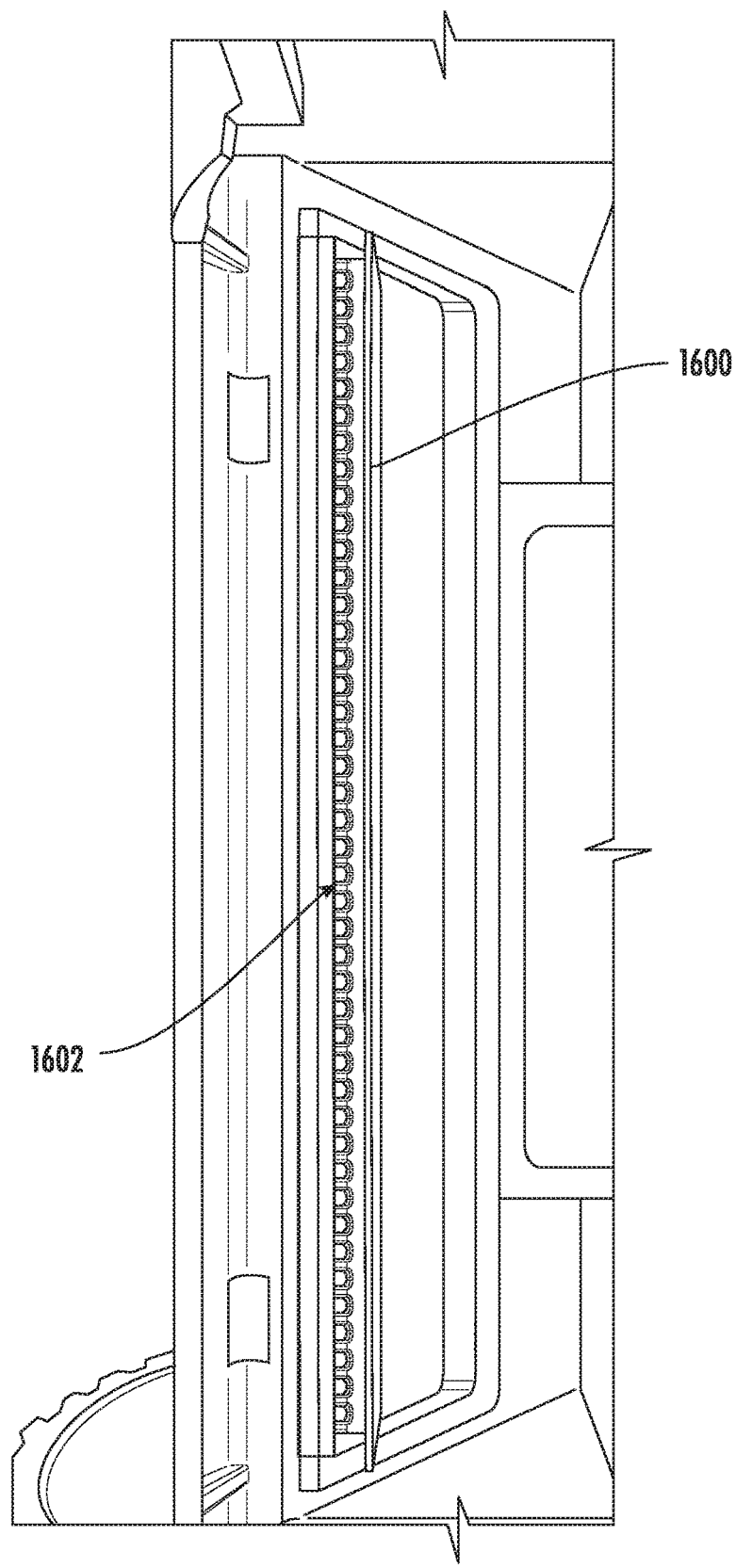
FIG. 17 shows another perspective view of the shutter of FIG. 16 in an evacuation position, consistent with embodiments of the present disclosure.

FIGS. 16 and 17 show an example of a shutter 1600 configured to transition between a cleaning position (e.g., as shown in FIG. 16) and an evacuation position (e.g., as shown in FIG. 17) to change an effective opening area of a debris inlet 1602. When the shutter 1600 is in the cleaning position, an effective opening area of the debris inlet 1602 is maximized. When the shutter 1600 is in the evacuation position, the shutter 1600 obstructs the debris inlet 1602 such that the effective opening area is reduced relative to the cleaning position.

An example robotic cleaner, consistent with the present disclosure, may include a body, an agitator chamber within the body, an agitator disposed within the agitator chamber, a dust cup removably coupled to the body, the dust cup including a debris inlet, the debris inlet fluidly coupling the dust cup to the agitator chamber, and a shutter configured to transition between a cleaning position and an evacuation position in response to rotational movement of the agitator.

In some instances, the shutter may include an arcuate portion having a shape that generally corresponds to a shape of the agitator. In some instances, the shutter may include a non-arcuate portion configured to engage the agitator such that engagement between the agitator and the non-arcuate portion urges the shutter between the cleaning position and the evacuation position. In some instances, the non-arcuate portion may include a comb. In some instances, the agitator chamber may include a plurality of stops configured to restrict movement of the shutter. In some instances, longitudinal distal end regions of the shutter may define collars configured to rotatably receive a portion of the agitator. In some instances, the collars may have an open end such that the collars extend around only a portion of the agitator. In some instances, each collar may define a flange configured to retain the shutter in floating engagement between the agitator and the agitator chamber. In some instances, the shutter may include an arcuate portion and a non-arcuate portion, the non-arcuate portion including a shroud configured to redirect air incident thereon in a direction of an effective opening area of the debris inlet. In some instances, the dust cup may include a plurality of debris inlets separated by a divider.

An example robotic cleaning system, consistent with the present disclosure, may include a docking station and a robotic cleaner configured to engage the docking station. The docking station may include an evacuation bin and a suction motor. The robotic cleaner may include a body, an agitator chamber within the body, an agitator disposed within the agitator chamber, a dust cup removably coupled to the body and configured to be fluidly coupled to the evacuation bin and the suction motor, the dust cup including a debris inlet, the debris inlet fluidly coupling the dust cup to the agitator chamber, and a shutter configured to transition between a cleaning position and an evacuation position in response to rotational movement of the agitator.

In some instances, the shutter may include an arcuate portion having a shape that generally corresponds to a shape of the agitator. In some instances, the shutter may include a non-arcuate portion configured to engage the agitator such that engagement between the agitator and the non-arcuate portion urges the shutter between the cleaning position and the evacuation position. In some instances, the non-arcuate portion may include a comb. In some instances, the agitator chamber may include a plurality of stops configured to restrict movement of the shutter. In some instances, longitudinal distal end regions of the shutter may define collars configured to rotatably receive a portion of the agitator. In some instances, the collars may have an open end such that the collars extend around only a portion of the agitator. In some instances, each collar may define a flange configured to retain the shutter in floating engagement between the agitator and the agitator chamber. In some instances, the shutter may include an arcuate portion and a non-arcuate portion, the non-arcuate portion including a shroud configured to redirect air incident thereon in a direction of an effective opening area of the debris inlet. In some instances, the dust cup may include a plurality of debris inlets separated by a divider.

Engage, as used herein, may refer to direct or indirect engagement unless explicitly stated otherwise.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A robotic cleaner comprising:
   a body;
   an agitator chamber within the body;
   an agitator disposed within the agitator chamber;
   a dust cup removably coupled to the body, the dust cup including a debris inlet, the debris inlet fluidly coupling the dust cup to the agitator chamber; and
   a shutter configured to transition between a cleaning position and an evacuation position in response to rotational movement of the agitator.

2. The robotic cleaner of claim 1, wherein the shutter includes an arcuate portion having a shape that generally corresponds to a shape of the agitator.

3. The robotic cleaner of claim 2, wherein the shutter includes a non-arcuate portion configured to engage the agitator such that engagement between the agitator and the non-arcuate portion urges the shutter between the cleaning position and the evacuation position.

4. The robotic cleaner of claim 3, wherein the non-arcuate portion includes a comb.

5. The robotic cleaner of claim 1, wherein the agitator chamber includes a plurality of stops configured to restrict movement of the shutter.

6. The robotic cleaner of claim 1, wherein longitudinal distal end regions of the shutter define collars configured to rotatably receive a portion of the agitator.

7. The robotic cleaner of claim 6, wherein the collars have an open end such that the collars extend around only a portion of the agitator.

8. The robotic cleaner of claim 7, wherein each collar defines a flange configured to retain the shutter in floating engagement between the agitator and the agitator chamber.

9. The robotic cleaner of claim 1, wherein the shutter includes an arcuate portion and a non-arcuate portion, the non-arcuate portion including a shroud configured to redirect air incident thereon in a direction of an effective opening area of the debris inlet.

10. The robotic cleaner of claim 1, wherein the dust cup includes a plurality of debris inlets separated by a divider.

11. A robotic cleaning system comprising:
  a docking station having an evacuation bin and a suction motor; and
  a robotic cleaner configured to engage the docking station, the robotic cleaner including:
    a body;
    an agitator chamber within the body;
    an agitator disposed within the agitator chamber;
    a dust cup removably coupled to the body and configured to be fluidly coupled to the evacuation bin and the suction motor, the dust cup including a debris inlet, the debris inlet fluidly coupling the dust cup to the agitator chamber; and
    a shutter configured to transition between a cleaning position and an evacuation position in response to rotational movement of the agitator.

12. The robotic cleaning system of claim 11, wherein the shutter includes an arcuate portion having a shape that generally corresponds to a shape of the agitator.

13. The robotic cleaning system of claim 12, wherein the shutter includes a non-arcuate portion configured to engage the agitator such that engagement between the agitator and the non-arcuate portion urges the shutter between the cleaning position and the evacuation position.

14. The robotic cleaning system of claim 13, wherein the non-arcuate portion includes a comb.

15. The robotic cleaning system of claim 11, wherein the agitator chamber includes a plurality of stops configured to restrict movement of the shutter.

16. The robotic cleaning system of claim 11, wherein longitudinal distal end regions of the shutter define collars configured to rotatably receive a portion of the agitator.

17. The robotic cleaning system of claim 16, wherein the collars have an open end such that the collars extend around only a portion of the agitator.

18. The robotic cleaning system of claim 17, wherein each collar defines a flange configured to retain the shutter in floating engagement between the agitator and the agitator chamber.

19. The robotic cleaning system of claim 11, wherein the shutter includes an arcuate portion and a non-arcuate portion, the non-arcuate portion including a shroud configured to redirect air incident thereon in a direction of an effective opening area of the debris inlet.

20. The robotic cleaning system of claim 11, wherein the dust cup includes a plurality of debris inlets separated by a divider.

* * * * *